United States Patent [19]

Overton

[11] 4,237,868

[45] Dec. 9, 1980

[54] SOLAR HEATING BALLOON

[76] Inventor: Charlie N. Overton, P.O. Box 31407, Dallas, Tex. 75231

[21] Appl. No.: 942,433

[22] Filed: Sep. 14, 1978

[51] Int. Cl.³ .............................................. F24J 3/02
[52] U.S. Cl. ................................... 126/443; 126/452
[58] Field of Search .............. 126/270, 271, 442, 443, 126/450, 452, 416; 237/1 A; 60/641

[56] References Cited

U.S. PATENT DOCUMENTS

| | | | |
|---|---|---|---|
| 3,980,071 | 9/1976 | Barber, Jr. | 237/1 A |
| 4,002,158 | 1/1977 | Radebold | 126/270 |
| 4,055,163 | 10/1977 | Costello et al. | 126/271 |
| 4,081,289 | 3/1978 | Campbell | 126/270 |
| 4,126,123 | 11/1978 | Hall | 126/271 |
| 4,137,903 | 2/1979 | Annett | 126/271 |

*Primary Examiner*—James C. Yeung
*Assistant Examiner*—Larry Jones
*Attorney, Agent, or Firm*—Hubbard, Thurman, Turner, Tucker & Glaser

[57] ABSTRACT

A solar heat collector comprising primarily an inflatable envelope transparent to solar radiation filled with a gas, lighter than air, and tethered to the earth's surface by a pair of fluid conduits for conducting a working fluid to and from the envelope. One conduit which conducts working fluid to the envelope terminates within the envelope in a nozzle for spraying the working fluid against the inner surface of the envelope at its upper end. The fluid then flows by means of gravity along the inner surface of the envelope collecting solar heat energy and flowing by the force of gravity down the second conduit for utilization at the earth's surface.

8 Claims, 1 Drawing Figure

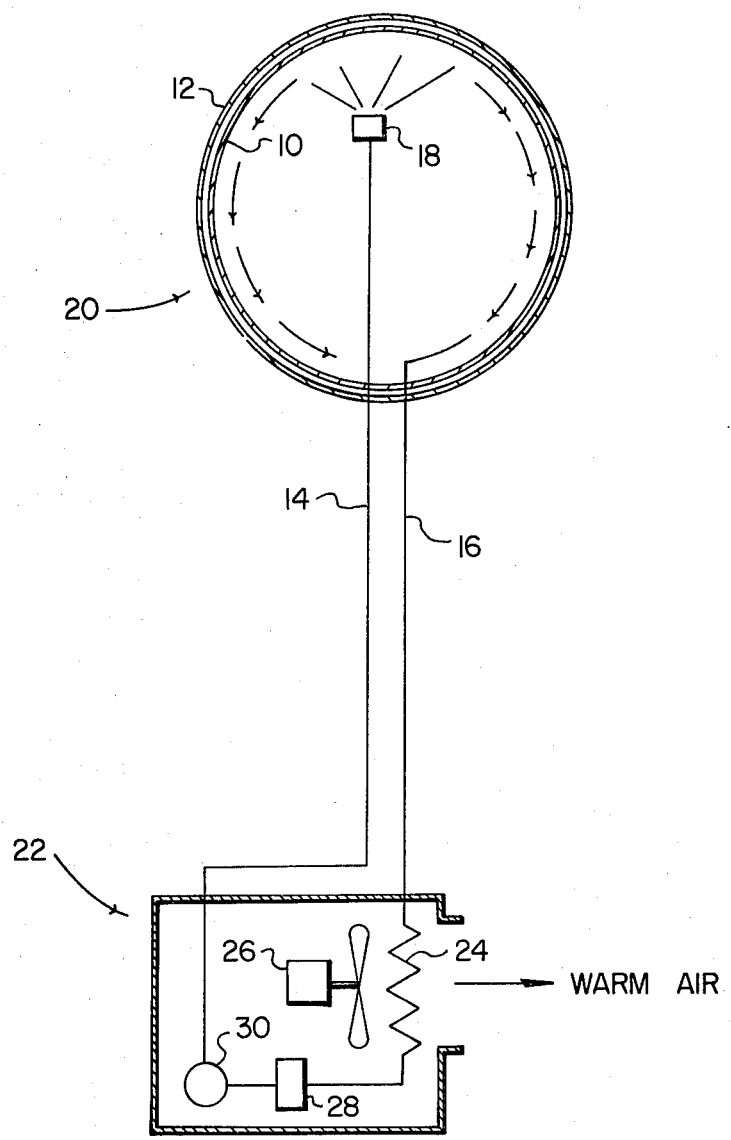

SOLAR HEATING BALLOON

BACKGROUND OF THE INVENTION

The present invention relates to solar heat collectors and more particularly to a buoyant balloon solar heat collector which floats at a sufficient altitude to avoid normal ground shadows.

A number of references are known to the present applicant which teach various forms of spherical solar heat collectors. These include the following U.S. Pat. Nos.: 3,934,573 issued to Dandini on Jan. 27, 1976; 4,034,735 issued to Waldrip on July 12, 1977; 4,043,315 issued to Cooper on Aug. 23, 1977; 4,056,093 issued to Barger on Nov. 1, 1977; and 4,081,289 issued to Campbell, III, on Mar. 28, 1978. While each of these patents teaches generally the usefulness of a spherical solar heat collector for receiving solar energy from all directions, they each also include various reflectors, or lenses, for energy concentration. The Cooper patent, for example, provides both reflective surfaces for directing solar energy to the spherical collector and numerous lenses on a spherical surface for focusing the reflected energy towards an absorbing device located within the spherical collector. In the Barger and Campbell, III, patents, a fluid-filled sphere acts as a lens to focus energy to a collecting surface below or within the sphere respectively.

Another patent believed to be relevant to the present invention is U.S. Pat. No. 4,002,158 issued to Radebold on Jan. 11, 1977. This patent teaches the construction of a hydrazine generator at an altitude of 10 to 20 kilometers above the earth's surface for the collection of solar energy. Part of this device includes parabolic solar reflectors constructed from inflatable elements which provide buoyancy to the solar energy collecting structure.

Thus it can be seen that there is great interest in providing means for collecting and using the essentially free solar energy. The above references point out the desirability of having a solar heat collector positioned at an altitude above the earth's surface where shadows will not reduce the efficiency of the device, but they also generally show that relatively complicated and expensive support structures are needed to place the devices at the desired elevation. Since the known devices typically use lenses or reflective mirrors, they tend to be relatively heavy and thus require heavy-duty support means. Other simpler devices are filled completely or substantially with a working fluid such as water, which is also extremely heavy, and thus requires heavy supporting structures.

SUMMARY OF THE INVENTION

Accordingly, an object of the present invention is to provide a simple but effective solar heat collector.

Another object of the present invention is to provide a solar heat collector which is lighter than air, and which may therefore be placed at an elevated position without the need for a supporting structure.

Another object of the present invention is to provide a solar heat collector that does not cast a shadow directly beneath itself.

A solar heat collector according to the present invention includes an inflatable air-tight envelope filled with a lighter than air gas and tethered to the earth by means of a pair of fluid conduits. A first conduit terminates within the envelope in a spray nozzle arranged to spray fluid on the inner surface of the envelope. The second conduit terminates in communication with the lower end of the envelope to provide a return path for heated fluid from the envelope. In a preferred form, a second envelope is positioned concentrically about the first to provide thermal insulation to the inner envelope.

BRIEF DESCRIPTION OF THE DRAWING

The present invention may be better understood by reading the following detailed description of the preferred embodiment with reference to the attached drawing which is a schematic diagram of a solar heat collector according to the present invention.

DESCRIPTION OF THE PREFERRED EMBODIMENT

With reference to the drawing, a solar heat collector according to the present invention includes inner and outer inflatable envelopes 10 and 12, first and second fluid conduits 14 and 16, and a horizontal spray nozzle 18. These elements generally comprise the floating or buoyant part of the solar heat collecting system referred to herein as the "balloon" and generally designated 20. Fluid conduits 14 and 16 extend from the balloon 20 to utilization equipment generally designated 22 on the surface of the earth. Lines 14 and 16 are preferably connected together to form a tether line for holding the balloon 20 into position. In a typical system, as illustrated, the utilization equipment 22 includes a liquid-to-air heat exchanger 24 through which air is driven by a fan 26. Also included on the earth's surface are typically a filter 28 and a pump 30 for moving fluid through lines 14 and 16 and the heat exchanger 24.

The balloon envelopes 10 and 12 are made from a relatively thin material through which solar radiation easily passes. Any material that will allow solar radiation to pass into the envelopes can be utilized. Preferably, the envelopes are made from a relatively clear, ultra-violet stable plastic film such as polyvinyl chloride, a polyester film such as mylar which is a trademark of E. I. du Pont de Nemours Co., or a polyethylene film material. The material should be basically transparent to the heat portion of the sun's light. It will be appreciated that in some instances, however, the envelopes may be dark and opaque and the benefits of this invention can still be obtained. While two envelopes 10 and 12 are illustrated, it is apparent that a single envelope could be used or that three or more envelopes could be used. The double wall construction as illustrated is preferred since it is the simplest arrangement which provides a gas insulation layer between the envelope in contact with the heat transferring fluid and the surrounding air. Additional envelopes would, of course, add additional layers of insulation and improve the efficiency of the system.

The balloon 20 is filled mostly with a gas, preferably hydrogen, or helium, to provide the necessary buoyancy to hold the balloon 20 at a desired altitude. The gas fills the areas both within envelope 10 and between envelopes 10 and 12 to provide the maximum buoyancy.

As illustrated by the arrows indicating flow direction, the conduit 14 is used to conduct a heat absorbing fluid from the ground surface to the balloon 20. Conduit 14 ends within the balloon 20 in a spray nozzle preferably selected to provide a horizontal, very fine mist, spray directed primarily at the upper portion of the inner surface of envelope 10. Any suitable liquid can be used as the heat collecting or working fluid such as water, glycol, low molecular weight alcohols, heavy ethers, mixtures of the foregoing and the like. The heat collecting fluid generally preferred is essentially all water with a stable dye, or finely divided particulate material, added for heat absorption. Preferably, the dye will be a dark colored material as, for example, a black dye. A suspension or colloid of finely divided particles, such as finely divided carbon black, is also quite useful in enhancing the heat absorption properties of the instant system. By spraying a fine mist of working fluid over at least a portion of the inner surface of envelope 10, a very thin sheet of the working fluid flows by gravity down the inner surface of envelope 10 to the bottom of the balloon 20, where it drains by gravity into return line 16. By this process, the heat collecting fluid is spread over a very large area to enhance the absorption of solar heat. The working fluid layer on the inside of envelope 10 is preferrably very thin and therefore adds very little weight to the balloon 20.

Conduits 14 and 16 are preferably lightweight conduits such as extruded plastic or rubber tubes of small diameter having sufficient strength to restrain the balloon. The inclusion of fibrous reinforcing material, such as glass fibers, steel fibers, nylon fibers and the like, in the conduits 14 and 16 is preferred to increase the strength of the conduits for the tethering purpose. In some instances and applications, it may be preferred to include additional restraining means to hold the inflated balloon in place and protect it from wind damage and the like.

While in the preferred form the working fluid comprises water containing a dye material as, for example, a black dye, it is believed that the coloring may not be necessary for proper operation of the solar heat collecting device. In particular, it is believed that when nozzle 18 is selected to break the fluid into a very fine mist which is exposed to sunlight, the small fluid particles act as a very efficient solar heat collector as they fall within the balloon and are collected by return line 16. Therefore, while the nozzle 18 is illustrated at a position very near the top of the balloon 20, it is only necessary that the nozzle be arranged to direct the spray towards the top to either contact the inner surface of balloon 10 and flow in a sheet, or to fall in the form of a fine mist towards the bottom of the balloon 20 for collection.

The present invention is especially useful for heating greenhouses. In such a use, the surface utilization equipment 22 is positioned at one end of the greenhouse with a warm air outlet directed to the interior of the greenhouse. The tether lines 14 and 16 are selected to have a length sufficient to place the balloon 20 at a height sufficiently above the roof of the greenhouse so that the balloon 20 is not shaded by either the greenhouse or surrounding trees or structures, and preferably high enough so that the balloon 20 itself does not shade the greenhouse. By such an arrangement, very little ground surface is consumed by the solar heating system and it provides very little interference with the commercial greenhouse operation. It will be noted that the height of the balloon 20 may be increased at very little expense since it primarily depends on the length of the tether line. The height, of course, will be limited by the maximum pressure supplied by pump 30 which must overcome the head built up in line 14. Once the system has been installed, hot air may be provided simply by supplying power to pump 30 which then pumps a working fluid up conduit 14 and through nozzle 18 to the inner surface of balloon 20. The water there absorbs solar heat and flows back through line 16 to heat exchanger 24 where the heat is transferred to air.

It will be apparent, of course, that heat exchangers other than the fluid to air exchanger 24 may be employed. For example, the return line 16 could be connected to a heat storage tank such as a large insulated water tank to provide heating during periods of darkness. Such heat storage tanks are wellknown and commercially available. It is also apparent that the present solar heat collector may be used for heating any type of structure such as a residential or commercial building, or even for heating swimming pools. It is especially adapted for use in remote areas where heavy equipment and fuel would be difficult to transport.

A contemplated improvement to the present invention would be the inclusion of a reflective surface on the bottom or north side of the balloon 20. This would involve providing a metallized layer on the outer surface of envelope 10. For a simple balloon as illustrated, about the lower one-third of the balloon would be metallized. If the balloon were oriented by additional tethers, the metallization could be extended to a portion of the north side of the balloon. The reflector would cause energy which had passed through the working fluid without absorption to be reflected back through the fluid for further absorption.

While the present invention has been shown and described in terms of specific apparatus, it is apparent that various modifications and changes can be made within the scope of the present invention as defined by the appended claims.

I claim:
1. A solar heat collector comprising:
   a first inflatable envelope transparent to solar heat radiation,
   a second inflatable envelope,
   a gas, lighter than air, substantially filling said first envelope, and the space between said first and second envelopes,
   first and second flexible fluid conduits connected to a lower side of said first envelope and extending to and attached to the surface of the earth to thereby tether said first envelope, said first conduit extending through said lower side of said first envelope to a point near the top of the inner surface of said first envelope, and said second conduit extending to the inner surface of the lower side of said first envelope,
   a nozzle connected to the end of said first conduit for directing fluid from said first conduit over at least a portion of the inner surface of said first envelope, and
   pump means for pumping heat absorbing fluid up said first conduit, and through said nozzle to the inner surface of said first envelope, first whereby said fluid is heated by solar radiation and is returned to the surface of the earth through said second conduit by gravity flow,
   wherein the buoyancy of said gas filled envelopes is sufficient to lift said envelopes, said fluid conduits, and said nozzle.

2. A solar heat collector according to claim 1 further including heat exchanging means on the earth's surface coupled to said first and second conduits and to said pump means for receiving heat absorbing fluid from said second conduit, transferring heat from said heat absorbing fluid to another medium and delivering the heat absorbing fluid to said pump means.

3. A solar heat collector according to claim 2 wherein said heat exchanging means transfers heat from said heat absorbing fluid to air.

4. Apparatus according to claim 1 wherein said heat absorbing fluid is substantially water.

5. Apparatus according to claim 4 wherein said heat absorbing fluid further includes a black dye for enhancing the heat absorption of said fluid.

6. Apparatus according to claim 4 wherein said heat absorbing fluid further includes a dark colored dye.

7. Apparatus according to claim 1 wherein said nozzle breaks said fluid into a fine mist.

8. A method of collecting solar energy comprising:
filling an inflatable envelope with a gas, lighter than air, so that said envelope floats in air,
tethering said envelope to the earth's surface by means of first and second flexible fluid conduits connected to a lower side of said envelope, said first conduit extending through said lower side of said envelope and terminating in a nozzle within said envelope,
pumping a heat absorbing fluid from the earth's surface up said first conduit to said nozzle at a point near the top of the inner surface of said envelope and thereby spraying said fluid over at least a portion of the inner surface of said envelope; and
returning said heat absorbing fluid to the earth's surface by means of said second conduit,
wherein the entire weight of said envelope, said first and second conduits, said nozzle, and heat absorbing fluid flowing through said conduits and envelope are supported by buoyancy of said envelope.

* * * * *